A. E. COOK & T. VAN TUYL.
VEHICLE BODY.
APPLICATION FILED DEC. 20, 1913.
1,237,175.
Patented Aug. 14, 1917.
2 SHEETS—SHEET 1.
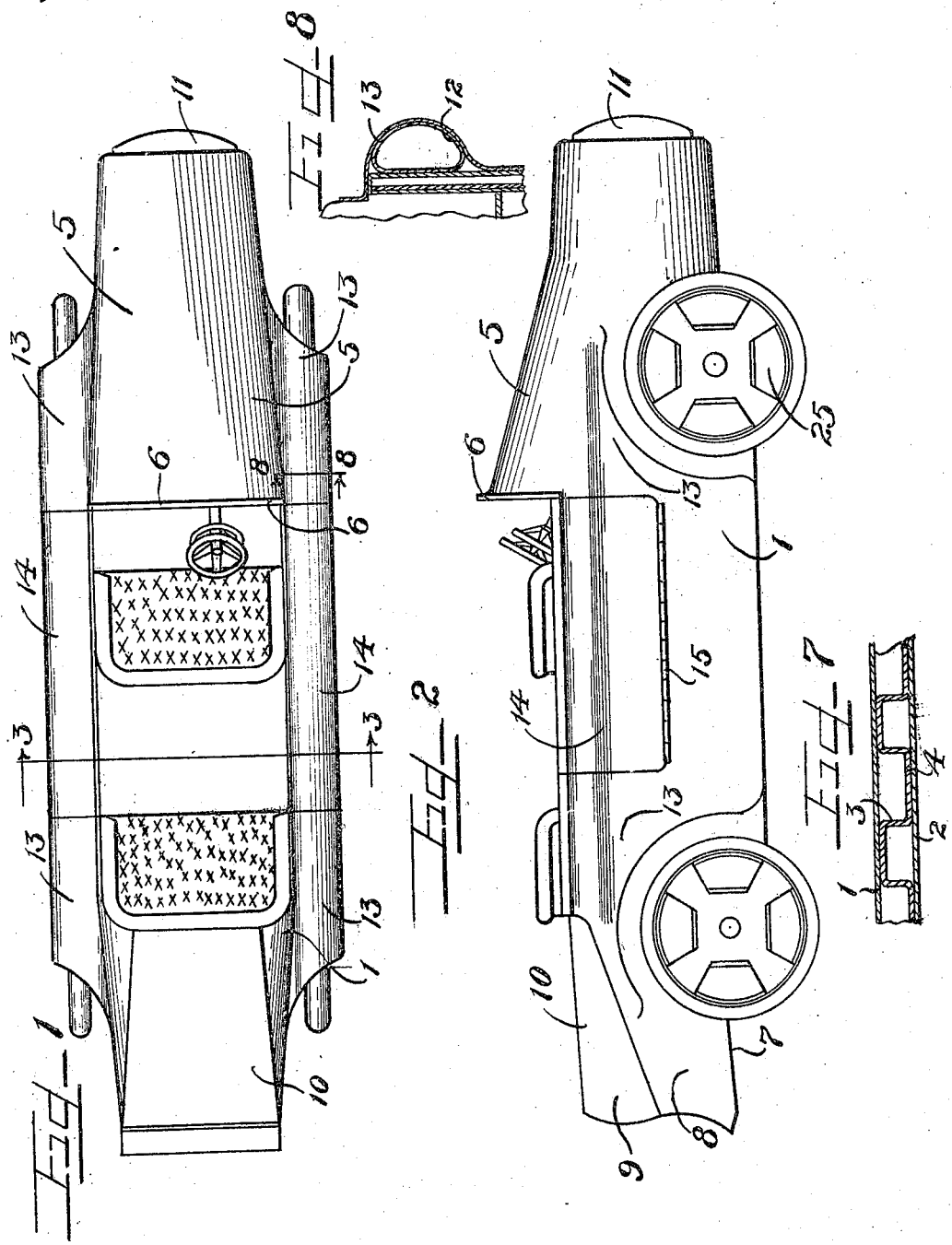
Witnesses
J. W. Angell
Charles D...
Inventors
Albert E. Cook.
Thomas Van Tuyl.
BY Charlesworth Atty.

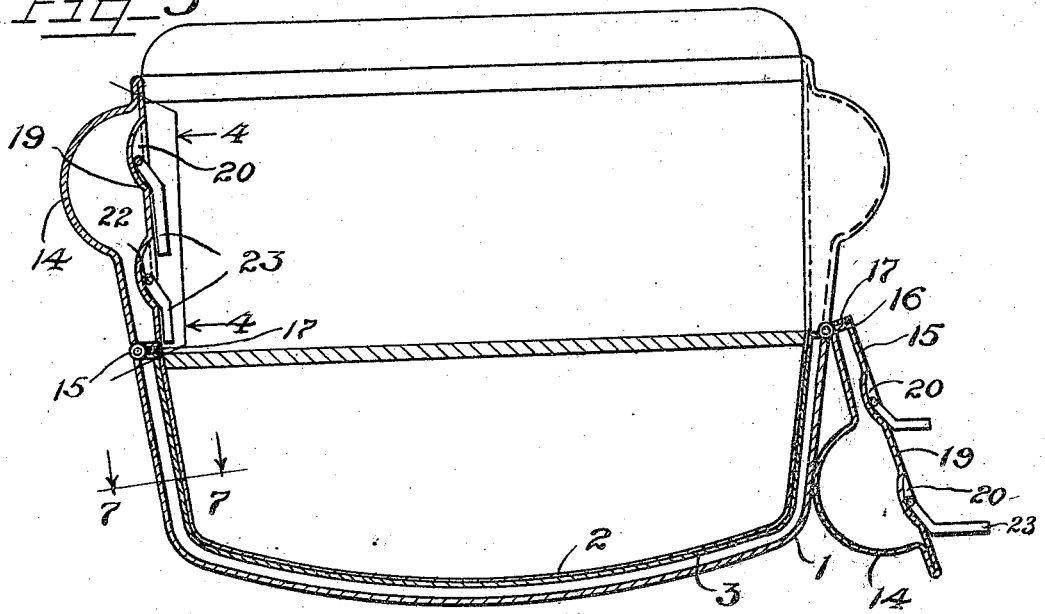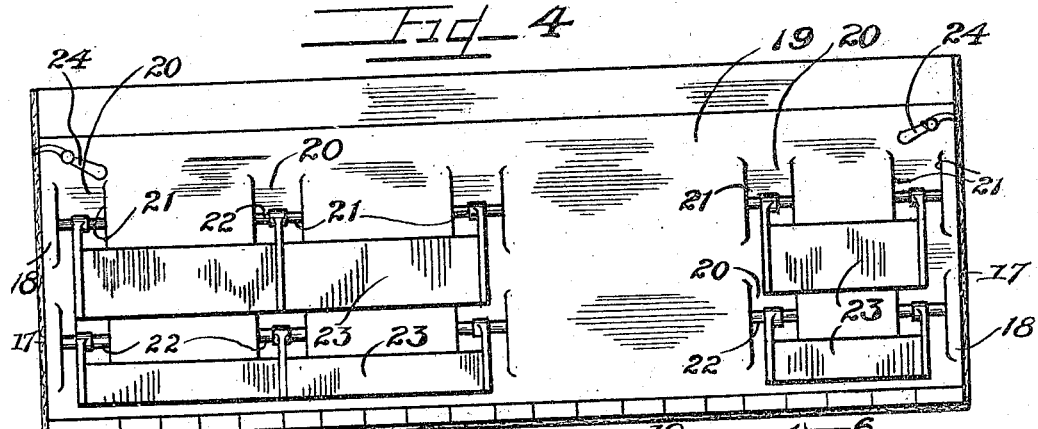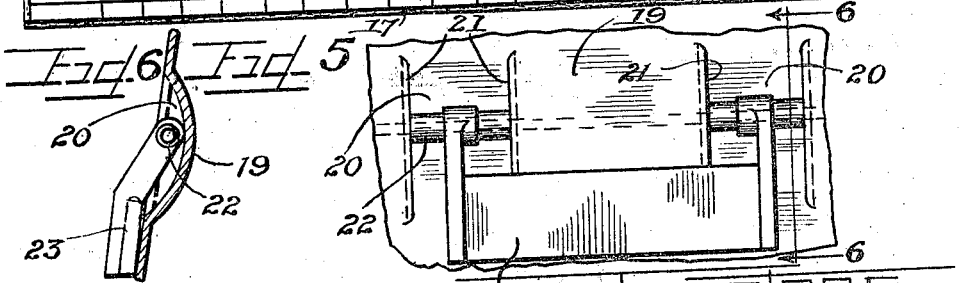

UNITED STATES PATENT OFFICE.

ALBERT E. COOK AND THOMAS VAN TUYL, OF KANKAKEE, ILLINOIS; SAID VAN TUYL ASSIGNOR TO SAID COOK.

VEHICLE-BODY.

1,237,175. Specification of Letters Patent. Patented Aug. 14, 1917.

Continuation of application Serial No. 589,888, filed October 31, 1910. This application filed December 20, 1913. Serial No. 807,845.

*To all whom it may concern:*

Be it known that we, ALBERT E. COOK and THOMAS VAN TUYL, citizens of the United States, and residents of the town of Kankakee, Kankakee county, and State of Illinois, have invented certain new and useful Improvements in Vehicle-Bodies; and we do hereby declare that the following is a full, clear, and exact description of the same, reference being had to the accompanying drawings, and to the numerals of reference marked thereon, which form a part of this specification.

This invention relates to vehicle bodies and constitutes a continuation of our joint application for patent for "Combined Land & Water Vehicles or Craft," filed Oct. 31, 1910, Serial No. 589,888.

A large number of automobiles of various kinds and types are now in use for almost every variety of purpose and use, including pleasure vehicles, trucks, and the like, for which good roads are a necessity and the usefulness of which, whether for pleasure or commerce, is largely dependent upon and limited to the character of the roadway. Little progress has, however, been made either for pleasure or for military use in the development and construction of a motor vehicle capable of operation and use in situations where good roads do not exist or wilderness where unbridged lakes and rivers are found, which must be crossed to avoid long detours. True, in a few instances, as feats of extreme hardihood and daring automobiles have been driven for shorter or longer distances through the more sparsely inhabited parts of the world, and through regions where good roads are seldom found. These are instances, however, of extreme hardihood on the part of the operator, and have not been followed as a rule by the use of the same or of similar cars and similar tours. To the huntsman and others, who seek the wilds, the automobile as heretofore constructed is worse than useless. This is also unquestionably true of the automobile for military uses, except in regions where satisfactory roads can be found.

The object of this invention is to provide an automobile adapted for use in the wilderness, and capable of use in regions where unbridged streams and lakes are found, and so constructed as to permit the automobile to be operated on land and over surfaces upon which the ordinary automobile will be unable to travel.

It is also an object of this invention to afford an automobile adapted for the use of hunters and others in regions remote from good roads, and to operate either upon the land or upon the water with equal facility.

It is a further object of the invention to afford a combined automobile and boat body or hull of the described type of form, so constructed as to permit the length of the vehicle to be readily increased for water use.

It is a further object of the invention to afford an automobile boat provided with air compartments on both sides thereof.

It is a further object of the invention to afford cellular structure for the main body or hull, so constructed as to afford a double sheathing or lining at the sides and bottom hull or body, having air chambers acting to increase the buoyancy in the water.

It is also an object of the invention to afford air chambers, one or more on each side of the vehicle, which serve as mud guards or fenders when in use upon the land, and serve as air chambers or air or gas reservoirs when on the water, and also to afford in one or both sides of the boat a folding section to permit ready entrance from the boat or automobile, and to provide steps on said folding sections which swing downwardly when the section is swung to open position, and which fall closed by gravity when said tie section is folded upwardly to close the side of the car or vehicle.

Numerous other objects of our invention will hereinafter be more fully set forth.

The invention consists in the matters hereinafter described and more fully set forth and defined in the appended claims.

In the drawings:

Figure 1 is a top plan view of a device embodying the invention.

Fig. 2 is a side elevation thereof.

Fig. 3 is a section taken on line 3—3 of Fig. 1.

Fig. 4 is a view taken on line 4—4 of Fig. 3.

Fig. 5 is an enlarged fragmentary view illustrating one of the steps.

Fig. 6 is a section taken on line 6—6 of Fig. 5.

Fig. 7 is a section taken on line 7—7 of Fig. 3 and illustrating the reinforcing means for the hull.

Fig. 8 is a section taken on line 8—8 of Fig. 1, and illustrating the lateral air chambers.

As shown in the drawings:

Said invention includes an automobile body or hull of the torpedo type, front and rear extensible sections affording air chambers, laterally disposed air chambers affording mud guards and increasing lateral stability when afloat, wheels for driving the vehicle upon the land and constructed to propel in mud or water, and a motor for propelling the same of any suitable or desired construction which may be positioned centrally or substantially below the load water line when afloat, and which, for convenience, has not been illustrated for the reason that it is not of the present invention. A steering and controlling mechanism is provided for the operator to assist him in controlling the vehicle, when either on land or in water.

The body or hull proper is constructed of pressed sheet metal to afford an outer sheathing or skin 1, which may be constructed in suitable sections and united substantially integrally by electric welding or by riveting to afford a water tight hull or body, within which is fitted an inner skin or sheathing or lining 2, conforming thereto and spaced therefrom, and united therewith by means of an inner reinforcing lining 3, which may be of corrugated sheet metal, the corrugations of which extend around said body transversely to afford closely arranged strengthening ribs and a multiplicity of independent air chambers around the bottom and sides of the body, and extending also around what may be termed the hood or forward deck of the vehicle. The outer and inner casing and the inner reinforcing corrugated lining are all rigidly united together to afford practically a unitary structure of cellular type. The corrugations may be made in the form indicated in Fig. 7, in which the corrugated sheet 4, is bent successively at a right angle. The construction mentioned enables the external and internal construction of the body to be made extremely light and at the same time afford great strength and buoyancy, and also efficient protection from puncturing and consequently injury when afloat.

Both the inner and outer casing or skins and the internal lining or reinforcement, are constructed of any suitable tough and strong sheet metal or alloy possessing great tensile strength and preferably of a material such as bronze alloy or aluminum alloy, which will not require painting. Said body is shaped at its front to afford a substantially circular hood end, around which said reinforcement may extend, and the top of said body extends upwardly and rearwardly to afford a turtle back deck 5, which extends to a dash 6, or combing which extends above the same sufficiently to protect the occupant of the body or hull from spray.

The rear end of the body or hull may be substantially as before described with reference to the front end, but conveniently and at the rear axle the body inclines upwardly at the bottom and rearwardly, then slightly downwardly to afford a substantially flat floor 7, and the top or upper wall extends obliquely downward to afford an after air chamber 8. Hinged at the rear extremity thereof is a folding section 9, comprising a sheet metal air chamber which may be reinforced in any suitable manner and is of a length when folded inwardly to close against the rear seat in the body to afford a symmetrical rear end for the automobile, but which, when extended, affords a rear extension air chamber having a flat under surface 10, and shaped to afford a floor to prevent the stern or rear end of the hull from settling when running at speed in the water. Any suitable means of course may be provided for securing said extension 9, in extended position.

Telescoping in the otherwise open front end of the body, is a telescoping section 11, which is circular in cross section and slightly tapered, and which affords when extended, an air and water tight compartment which greatly extends the length of the body and increases the buoyancy and stability of the craft when used in the water. Of course, it is obvious that any number of said interfitting extension members 11, may be employed to afford the requisite longitudinal extension for speed and comfort.

Laterally disposed air chambers 12, extend longitudinally of the vehicle body and over the wheels, and serve at their ends as mudguards when the vehicle is upon land, and serve to insure great lateral stability when afloat. These air chambers also serve a very important purpose in affording storage tanks for air or gas under high pressure to be used for any purpose required, among which may be considered the starting of the engine or motor and the giving of signals or any other of the numerous uses which may arise.

The body of the vehicle at each end, and below the ends of said air chambers or mud guards, is recessed to receive the wheels, and extending upwardly and outwardly therefrom the outer casing or skin of the body affords attachment for an outwardly and downwardly directed plate 13, the edges of which are riveted, welded, or brazed or otherwise secured to the wall of the body to afford chambers adapted, if preferred, to inclose the air chamber 12, as shown in Fig. 8.

A downwardly folding section 14, affording access to the operating seat and tonneau or rear seat of the body is hinged to the body at a point not far from the load water line when afloat and fits closely therein, as shown in Figs. 1 to 3 inclusive. A continuous hinge 15, is provided along the meeting edges of said hinge section 14, and the automobile body, and a recess 16, is provided on the inner side of and along said hinge to receive any suitable resilient packing 17, such as rubber, the construction of which when said hinge section is secured in closed position, prevents leaking along the hinge, and also, of course, similar or any suitable packing material 18, is provided between the ends of said hinge section and the body to prevent leaking around the ends of said hinge section, as well as at the bottom.

The construction described provides six independent and individual air chambers, one at each end of the body, and two on each side thereof, and one each on said hinge sections. The three lateral chambers on each side of the body, however, afford a succession of practically continuous air chambers on each side of the body, which may be normally above load water line, or the central chamber may be at load water line. These lateral chambers are to greatly extend the width of the body and to prevent rolling, capsizing or sinking. Said lateral air chambers and the permanently inclosed air chambers in the bow and stern of the craft are sufficient in capacity in themselves to insure flotation with full equipment and passengers, even should the craft fill with water when afloat.

As shown in Figs. 4 to 6 inclusive the ends of the casing 19, of the hinge section 14, are struck or bent to afford a plurality of recesses 20, provided with end walls 21, through which rigid bars 22, extend in position to receive the pivoted ends of the step 23, to permit the same to fall by gravity to supporting position to afford substantially horizontal surfaces when the hinged section 14, is turned down as shown in Fig. 3, and collapse to closed position against said inner casing 19, when the hinge section 14, has raised, as shown in Fig. 3. A latch 24, is provided on the inner side of each end of the rear of the upper end of these hinged sections to engage and lock the same in closed position. A relatively broad front operating seat, and a rear seat, extend transversely through the craft.

The road wheels may be utilized as propelling means when afloat. For this purpose the wheels are constructed of sheet metal, as shown in Fig. 2, and are provided equal distances apart with recesses or openings therethrough extending from the rim inwardly to near the hub, and the sides of which are substantially in alinement with a radius, and secured therein are fins 25, which, when the vehicle is in use upon the road, may be turned inwardly and secured in place, and which may be turned outwardly when the vehicle is desired to be used in water.

The operation is as follows:

When equipped and adjusted for the road, or upon ordinary surfaces, the propelling fins in the wheels are turned inwardly and the extensible sections are retracted, telescoped, folded, collapsed, or in any manner secured within or on the body of the vehicle to reduce the length thereof to the length usual for automobiles of corresponding power and capacity, and the vehicle is operated, as is usual, with vehicles of the kind.

When so adjusted, entrance to the body of the car is effected by means of the hinge section 14, which may be turned downwardly to afford steps leading to the front and rear seats of the body. When said section on either side of the car is turned downwardly as shown in Fig. 3, the steps 23, fall by gravity into operative position, and when said section is folded upwardly to closed position, said steps fall by gravity to a position flat against the inner side of the casing, at which time the steps are entirely retracted and out of the way. The packing secured around said folded section, although relatively unimportant when the vehicle is operated upon the land, insures tight joints when afloat. Should mud be encountered, or in the event that it becomes necessary to cross soft or swampy land, the wheel fins 25, may be adjusted to position to insure proper propulsion.

Should a body of water, such as a stream or lake be encountered, which it becomes desirable to cross or on which it is desirable to navigate the craft, the fins 25, on the wheels are adjusted outwardly and the front and rear extensible sections may be adjusted outwardly before the vehicle enters the water. The effect of the longitudinal extension of the hull or body increases the length of the hull, renders the craft much more sea-worthy, and more comfortable for the occupants when afloat. Furthermore, the large increase of the submerged section owing to such extension, enormously increases the stability of the craft and reduces draft, the increased buoyancy being of course, an important factor for safety.

The laterally disposed air chambers contained in the chambers and in the down folding door or hinged section also increase stability, and are of such extent that should the body portion of the vehicle fill with water, these, with the air chambers afforded in the extension sections, will be sufficient to support the entire craft with its passengers.

Of course, the cellular or double hull construction adds very greatly to the strength, stability and buoyancy, owing to the fact it is possible to secure great strength with comparatively light weight. It is also very important for the reason that should either the inner or outer casing of the hull or body be punctured, the other casing and the interior reinforcement will always serve to prevent leakage or danger therefrom.

While we have particularly described the hinged sections 14, and pivoted steps 23, as embodied in our invention in connection with a combined land and water vehicle or craft, it is obvious that the same may be readily applied to an automobile or carriage of the usual construction, and when so used will afford a body of smooth exterior finish and stream-line form. It is evident that any rudder may be employed that is thought desirable. Inasmuch, however, as the steering can be readily effected by means of the front wheels such a rudder is not shown or described.

We have attempted to show in simple and practical form, a construction adapted for military use and the use of the hunter and pleasure seeker in the wilderness, and to afford a construction capable of use wheresoever the operator may desire to go, whether on land or afloat. Numerous details of construction may of course be varied without departing from the principles of this invention. We therefore do not purpose limiting the patent granted otherwise than necessitated by the prior art.

We claim as our invention:

1. A land and water craft embracing a body adapted for use as a boat, wheels supporting the same and adapted to propel whether on land or water, a recessed hinge section forming a part of the body on one side thereof adapted to turn outwardly and downwardly and gravity acting steps in said recesses on the inner side thereof acting to swing into horizontal position when said hinge section is opened and to collapse when the hinge section is in closed position, said sections having air chambers therein to afford buoyancy.

2. A land and water craft embracing a boatlike body, wheels thereon for propelling on land and water, a chambered buoyant hinge section forming a part of said body on one side thereof adapted to turn downwardly and outwardly, gravity acting steps on the inner side thereof adapted to swing to horizontal position when said hinge section is opened, and to collapse downwardly when the hinge section is closed, and packing secured around said section.

3. A land and water craft embracing an automobile, a boatlike body thereon, a recessed hinge section in both sides thereof forming a part of the body adapted to turn downwardly and outwardly, gravity acting steps in said recesses adapted to swing to horizontal position when said hinge section is opened, and to collapse downwardly when the hinge section is in closed position, packing to prevent leakage around said sections, and an air chamber in said sections.

4. In a device of the class described a body a down folding recessed side portion therein, and hinged gravity acting steps therein.

5. In a device of the class described a body or hull, a side wall section hinged to turn outwardly and downwardly, gravity acting steps thereon, and an air tank or chamber on said hinged section.

6. A vehicle comprising a buoyant body, wheels supporting the same, a chambered hinged section on one side thereof adapted to be turned outwardly and downwardly and gravity acting steps on the inner side thereof acting automatically to swing to horizontal position when said hinge section is opened, and to collapse when said hinge section is in closed position.

7. A vehicle embracing a buoyant body, wheels thereon for propelling the same, a hinged section forming a part of said body on one side thereof adapted to turn downwardly and outwardly, said section having an air chamber therein, gravity acting steps seated in the inner side of said section adapted to swing to horizontal position when said hinged section is closed, and packing secured around said section.

8. In a vehicle of the class described hinged sections on the sides thereof adapted to be turned downwardly and outwardly, hinged gravity acting steps pivoted in recesses on the inner side thereof adapted to swing to horizontal position when said hinged sections are open, and to collapse downwardly when said hinged sections are in closed position.

In testimony whereof we have hereunto subscribed our names in the presence of two subscribing witnesses.

ALBERT E. COOK.
THOMAS VAN TUYL.

Witnesses:
CHARLES W. HILLS, Jr.,
FRANK K. HUDSON.